US009458758B2

(12) United States Patent
Hyodo et al.

(10) Patent No.: US 9,458,758 B2
(45) Date of Patent: Oct. 4, 2016

(54) COOLING FAN CONTROL DEVICE

(71) Applicant: KCM Corporation, Inami-cho, Kako-gun, Hyogo (JP)

(72) Inventors: Koji Hyodo, Kasumigaura (JP); Atsushi Shimazu, Toride (JP); Isamu Aoki, Tsukuba (JP); Tetsuji Tanaka, Abiko (JP); Keigo Kikuchi, Ryugasaki (JP)

(73) Assignee: KCM Corporation, Hyogo (JP)

( * ) Notice: Subject to any disclaimer, the term of this patent is extended or adjusted under 35 U.S.C. 154(b) by 289 days.

(21) Appl. No.: 14/358,324

(22) PCT Filed: Nov. 15, 2012

(86) PCT No.: PCT/JP2012/079688
§ 371 (c)(1),
(2) Date: May 15, 2014

(87) PCT Pub. No.: WO2013/073631
PCT Pub. Date: May 23, 2013

(65) Prior Publication Data
US 2014/0311140 A1  Oct. 23, 2014

(30) Foreign Application Priority Data
Nov. 15, 2011  (JP) ................... 2011-250021

(51) Int. Cl.
| F16D 31/02 | (2006.01) |
| F01P 7/02 | (2006.01) |
| F16H 61/4165 | (2010.01) |
| F16H 61/4043 | (2010.01) |
| F01P 7/04 | (2006.01) |
| F16H 61/4061 | (2010.01) |
| F01P 5/04 | (2006.01) |
| E02F 9/22 | (2006.01) |
| B60K 25/02 | (2006.01) |

(52) U.S. Cl.
CPC ................ *F01P 7/02* (2013.01); *F01P 5/043* (2013.01); *F01P 7/044* (2013.01); *F16H 61/4043* (2013.01); *F16H 61/4061* (2013.01); *F16H 61/4165* (2013.01); *B60K 2025/026* (2013.01); *E02F 9/226* (2013.01)

(Continued)

(58) Field of Classification Search
CPC .......... F16H 61/4043; F16H 61/4061; F16H 61/4165
See application file for complete search history.

(56) References Cited

U.S. PATENT DOCUMENTS

| 6,750,623 B1 * | 6/2004 | McCauley ............. F01P 7/044 318/260 |
| 7,240,486 B2 * | 7/2007 | Huang ................... F16D 31/00 60/456 |
| 7,856,951 B2 * | 12/2010 | Kamado ................ F01P 5/043 60/493 |
| 7,937,938 B2 * | 5/2011 | Kuipers ............. F16H 61/4043 60/456 |
| 2009/0120386 A1 | 5/2009 | Kamado et al. |
| 2012/0060777 A1 | 3/2012 | Tikkanen et al. |

FOREIGN PATENT DOCUMENTS

| JP | 2006-45808 A | 2/2006 |
| JP | 2006-57601 A | 3/2006 |
| JP | 2007-16667 A | 1/2007 |
| JP | 2010-236556 A | 10/2010 |
| WO | WO 2010/083816 A1 | 7/2010 |

OTHER PUBLICATIONS

International Search Report (PCT/ISA/210) with English translation dated Feb. 26, 2013 (Five (5) pages).

* cited by examiner

*Primary Examiner* — Michael Leslie
(74) *Attorney, Agent, or Firm* — Crowell & Moring LLP

(57) ABSTRACT

A cooling fan control unit, in response to an operation performed at the rotation direction selector switch to select a reverse rotation setting while the cooling fan is rotating forward, lowers a relief pressure setting at the variable relief valve to a predetermined lower limit value over a predetermined length of time, and once the discharge pressure at the hydraulic pump detected by the pressure sensor is lowered to a predetermined switch-over pressure, executes control so as to switch the direction of flow of pressure oil to the hydraulic motor to the reverse direction by switching the direction switching valve and raises the relief pressure setting at the variable relief valve to a reverse rotation pressure setting, at which the hydraulic motor rotates in the reverse direction, over a predetermined length of time.

4 Claims, 6 Drawing Sheets

COOLING FAN CONTROL DEVICE

TECHNICAL FIELD

Figure 1:
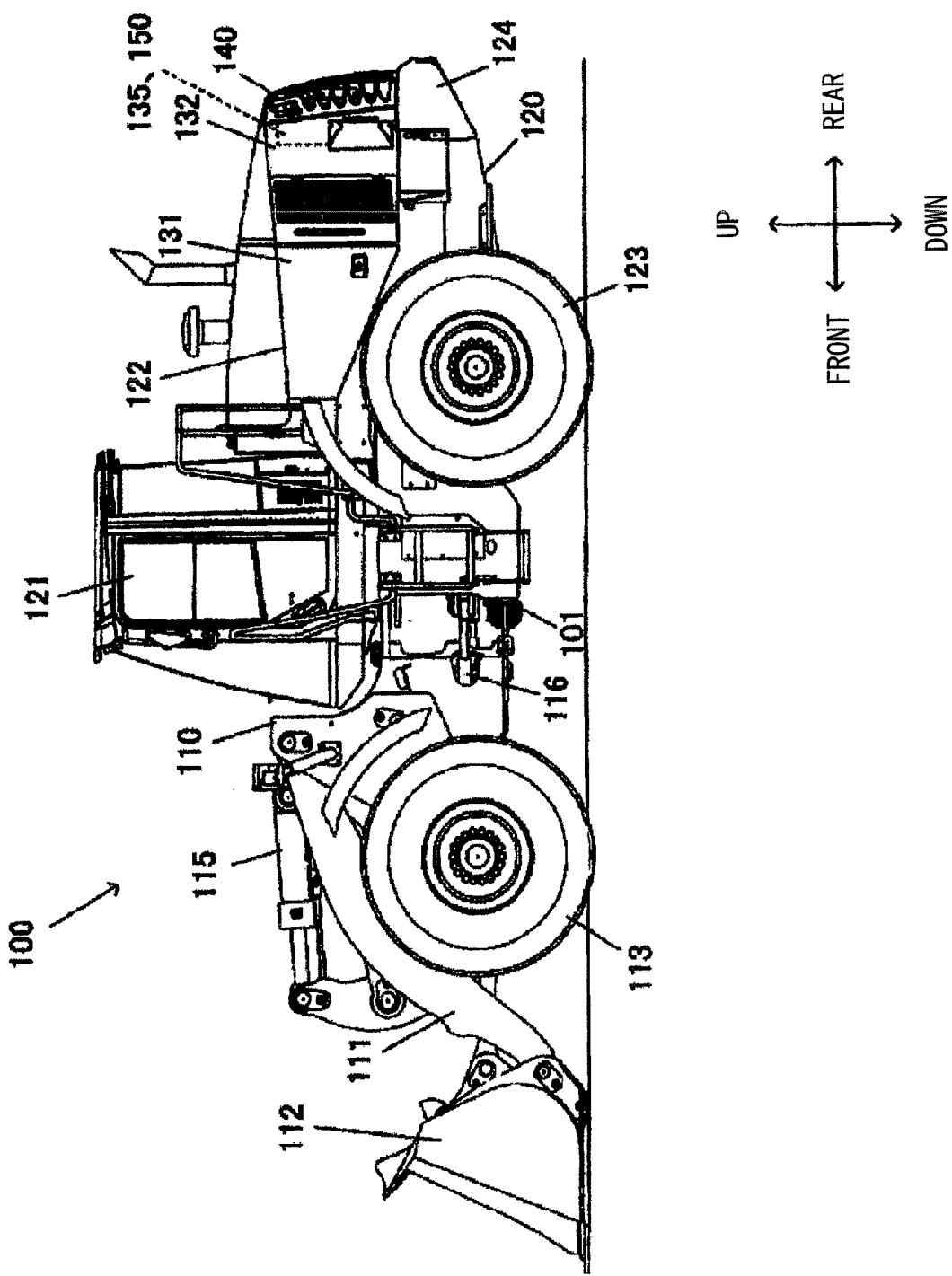

The present invention relates to a cooling fan control device.

BACKGROUND ART

There are work vehicles known in the related art equipped with a cooling fan used to deliver cooling air to a heat exchanger such as a radiator. If the cooling air is supplied along a single flow direction by such a cooling fan, dust that is carried in the cooling air will be delivered to the heat exchanger and will result in clogging. Accordingly, a cooling fan control device that causes the cooling fan to rotate in the reverse direction and thus reverses the air flow direction so as to remove accumulated dirt has been proposed (see patent literature 1).

As an operation is performed to switch the rotation direction of the cooling fan currently rotating forward, the cooling fan control device disclosed in patent literature 1 outputs a control signal for a relief valve, which allows the pressure setting to be adjusted, so as to lower the output-side pressure at the hydraulic pump (the intake-side pressure at a hydraulic motor) to a switch-over pressure, and then after the elapse of a specific length of time that is required to allow the rotation speed at the hydraulic motor to decay, the cooling fan control device outputs a control signal that causes the hydraulic motor to rotate in the opposite direction. Subsequently, it outputs a control signal for the variable relief valve to raise the output-side pressure at the hydraulic pump to a reverse rotation pressure.

CITATION LIST

Patent Literature

Patent literature 1: Japanese Laid Open Patent Publication No. 2006-45808

SUMMARY OF INVENTION

Technical Problem

As described above, the cooling fan control device disclosed in patent literature 1 outputs a control signal that causes the hydraulic motor to rotate in the opposite direction after the length of time required to allow the rotation speed at the hydraulic motor to decay elapses. This means that the control signal, in response to which the hydraulic motor is made to rotate in the opposite direction will be output even if the rotation speed of the hydraulic motor does not become sufficiently low within the allotted length of time due to, for instance, a malfunction of the controller or the variable relief valve.

Under such circumstances, the pressure in the hydraulic circuit may increase sharply during the rotation direction switching operation performed to switch the rotation direction from forward to reverse, placing an excessive load on various components in the hydraulic circuit, resulting in reduced durability of those components.

Solution to Problem

A cooling fan control device according to a first aspect of the present invention comprises: a hydraulic pump driven by an engine; a hydraulic motor that is driven with pressure oil discharged from the hydraulic pump and rotates a cooling fan used to supply cooling air to a heat exchanger; a direction switching valve that causes the hydraulic motor to rotate in a forward direction or in a reverse direction by switching direction of a flow of oil discharged from the hydraulic pump; a variable relief valve via which a discharge pressure at the hydraulic pump is controlled; a pressure sensor that detects the discharge pressure at the hydraulic pump; a rotation direction selector switch for switching a rotation direction of the cooling fan; and a control unit that, in response to an operation performed at the rotation direction selector switch to select a reverse rotation setting while the cooling fan is rotating forward, lowers a relief pressure setting at the variable relief valve to a predetermined lower limit value over a predetermined length of time, and once the discharge pressure at the hydraulic pump detected by the pressure sensor is lowered to a predetermined switch-over pressure, executes control so as to switch the direction of flow of pressure oil to the hydraulic motor to the reverse direction by switching the direction switching valve and raises the relief pressure setting at the variable relief valve to a reverse rotation pressure setting, at which the hydraulic motor rotates in the reverse direction, over a predetermined length of time.

According to a second aspect of the present invention, in the cooling fan control device according to the first aspect, it is preferable that, as the rotation direction selector switch is operated to a forward rotation setting while the cooling fan is rotating in the reverse direction, the control unit lowers the relief pressure setting at the variable relief valve to the predetermined lower limit value over a predetermined length of time, and once the discharge pressure at the hydraulic pump detected by the pressure sensor is lowered to the predetermined switch-over pressure, the control unit executes control so as to switch the direction of flow of pressure oil to the hydraulic motor to the forward direction by switching the direction switching valve, and raises the relief pressure setting at the variable relief valve to a forward rotation pressure setting, at which the hydraulic motor rotates in the forward direction, over a predetermined length of time.

According to a third aspect of the present invention, in the cooling fan control device according to the second aspect, it is preferable that the forward rotation pressure setting at which the hydraulic motor rotates in the forward direction is higher than the reverse rotation pressure setting at which the hydraulic motor rotates in the reverse direction, and the switch-over pressure is lower than the reverse rotation pressure setting at which the hydraulic motor rotates in the reverse direction.

According to a fourth aspect of the present invention, in the cooling fan control device according to any one of the first to third aspects, it is preferable that the control unit includes a connecting condition determination unit that determines as to whether or not a connecting condition between the variable relief valve and the control unit is normal; and if the connecting condition determination unit determines that the connecting condition is not normal, the control unit sustains a current rotation direction at the cooling fan without switching the direction switching valve even if the rotation direction selector switch is operated to select the reverse rotation setting while the cooling fan is rotating forward.

Advantageous Effect of the Invention

According to the present invention, the pressure inside the hydraulic circuit is not allowed to increase drastically as the cooling fan rotation direction is switched and, as a result, the cooling fan currently rotating in the forward direction, is allowed to smoothly shift into reverse rotation without compromising the durability of various components in the hydraulic circuit.

BRIEF DESCRIPTION OF THE DRAWINGS (FIG. 1) A side elevation of a wheel loader representing an example of a work vehicle (FIG. 2) A schematic illustration of the structure of the cooling system in the wheel loader (FIG. 3) Tables used in relief valve pressure setting control (FIG. 4) A flowchart of the processing pertaining to the cooling fan rotation direction switching operation (FIG. 5) A time chart indicating operational statuses assumed during a rotation direction switching operation performed to switch the rotation direction of the cooling fan currently rotating forward, to the reverse direction (FIG. 6) A time chart indicating operational statuses assumed during a rotation direction switching operation performed to switch the rotation direction of the cooling fan currently rotating in the reverse direction, to the forward direction

DESCRIPTION OF EMBODIMENT

In reference to drawings, an embodiment of the cooling fan control device according to the present invention is described. FIG. 1 is a side elevation of a wheel loader representing an example of a work vehicle in which the cooling fan control device achieved in the embodiment may be installed. The wheel loader 100 comprises a front body 110 that includes an arm 111, a bucket 112, tires 113 and the like and a rear body 120 that includes an operator's cab 121, an engine compartment 122, tires 123 and the like. The engine compartment 122 is shielded by a compartment cover 131. A counterweight 124 is mounted at the rear of the rear body 120.

As the arm 111 is driven by an arm cylinder (not shown) it swings up/down and as the bucket 112 is driven by a bucket cylinder 115, it swings up/down. The front body 110 and the rear body 120 are linked via a center pin 101 so as to be allowed to articulate relative to each other. As a steering cylinder 116 extends/contracts, the front body 110 pivots to the left or to the right relative to the rear body 120.

A radiator frame 135 and a cooling fan unit 150 are disposed at positions rearward relative to the compartment cover 131. A radiator 6 that cools water to be used to cool an engine 1, an oil cooler 7 that cools hydraulic oil and the like, all shown in FIG. 2 in reference to which a description will be provided later, are mounted at the radiator frame 135. The radiator frame 135 is fixed to the rear body 120. The cooling fan unit 150 includes a cooling fan 4 driven by a fan motor 3 and a fan shroud 151, both shown in FIG. 2 in reference to which a description will be provided later, and is installed further rearward relative to the radiator frame 135.

The side surfaces and the upper surfaces of the radiator frame 135 and the cooling fan unit 150 are shielded with a cooler compartment cover 132 (see FIG. 1). The cooler compartment cover 132 has an opening located at the rear, which is shielded with a grill 140 mounted so that it can be opened/closed. A plurality of openings are formed at the grill 140 so as to assure ventilation as air is taken into or let out from the cooling fan 4.

Figure 2:
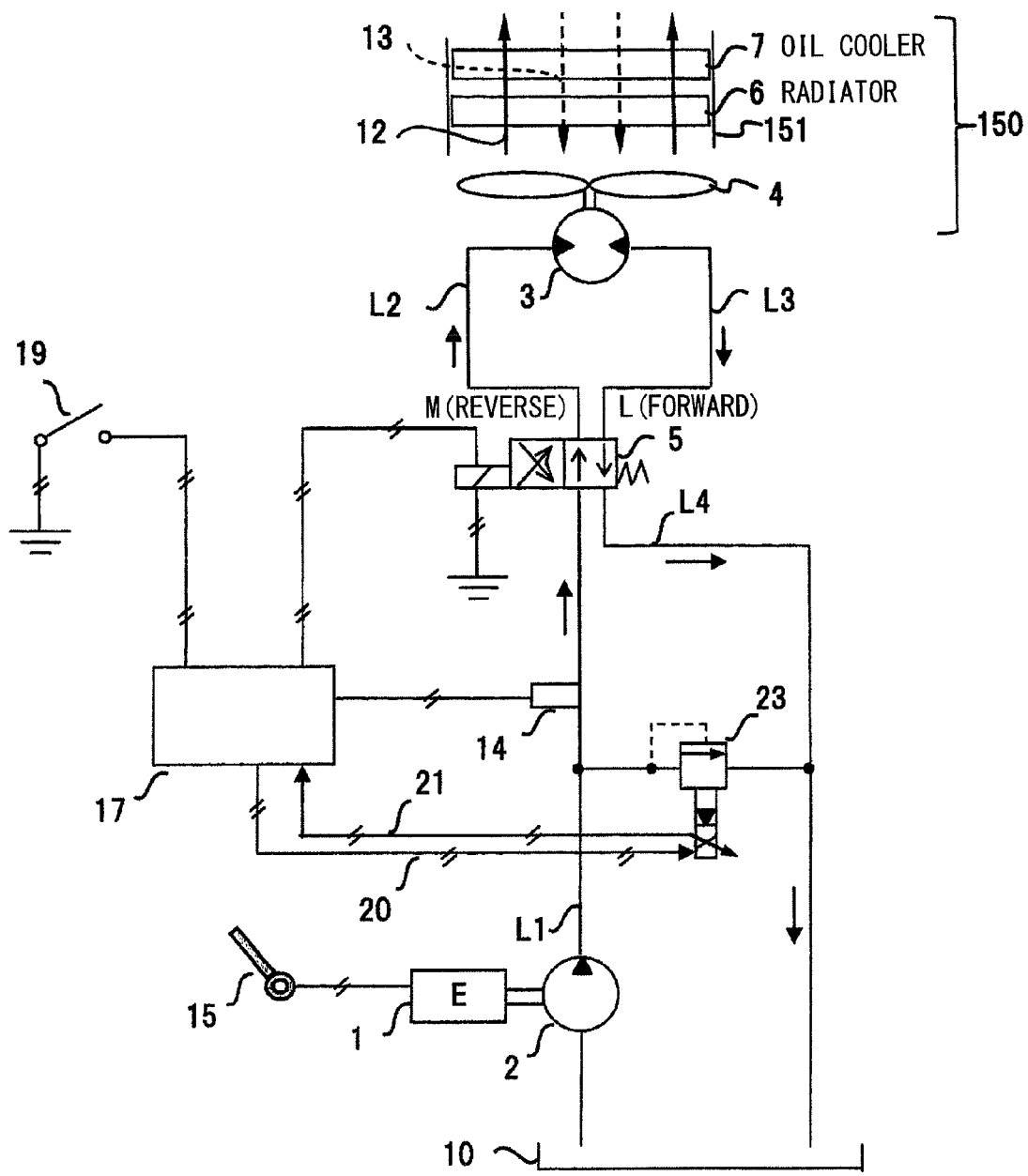

FIG. 2 schematically illustrates the structure of the cooling system in the wheel loader 100. The wheel loader 100 is equipped with the engine 1, a hydraulic pump 2 for an auxiliary unit, which is driven by the engine 1, the fan motor 3 driven with pressure oil output or discharged from the hydraulic pump 2 and the cooling fan 4 caused to rotate by the fan motor 3. The rotation rate of the engine 1 rises as an extent to which an accelerator pedal 15 is depressed increases. The increase in the engine rotation rate causes an increase in the rotation rate at the hydraulic pump 2, resulting in an increase in the pump discharge amount. The fan motor 3, which is driven with the pressure oil provided via the hydraulic pump 2, rotates the cooling fan 4 used to supply cooling air to the radiator 6 and the oil cooler 7.

The wheel loader 100 is further equipped with a selector switch 19, via which the rotation direction of the cooling fan 4 is switched, and a direction switching valve 5 by which the direction of flow of the oil discharged from the hydraulic pump 2 is switched so as to cause the fan motor 3 to rotate in the forward direction or in the reverse direction.

The direction switching valve 5, which is an electromagnetic switching valve, is switched to an L position (forward) or an M position (reverse) in response to an operation at the selector switch 19 installed in the operator's cab 121. As the selector switch 19 is turned off, the direction switching valve 5 is switched to the L position (forward) and as a result, pressure oil from the hydraulic pump 2 is delivered to the fan motor 3 via pipelines L1 and L2, thereby causing the fan motor 3 and the cooling fan 4 to rotate in the forward direction. The oil, having been delivered to the fan motor 3, flows back to a tank 10 via pipelines L3 and L4. As the selector switch 19 is turned on, the direction switching valve 5 is switched to the M position (reverse), and in this case, pressure oil from the hydraulic pump 2 is delivered to the fan motor 3 via the pipelines L1 and L3, thereby causing the fan motor 3 and the cooling fan 4 to rotate in the reverse direction. The oil having been delivered to the fan motor 3 then flows back to the tank 10 via the pipelines L2 and L4.

A variable pressure setting-type relief valve 23, which regulates the output-side pressure at the hydraulic pump 2 (hereafter referred to as pump discharge pressure Pp), i.e., the intake-side pressure (motor drive pressure) at the fan motor 3, is disposed between the pipeline L1 and the pipeline L4. A pressure sensor 14 that detects the pump discharge pressure Pp is disposed in the pipeline L1 on the output side of the hydraulic pump 2. Information indicating the pump discharge pressure Pp, detected by the pressure sensor 14, is input to a controller 17.

The controller 17 is configured so as to include an arithmetic processing device constituted with a CPU, a ROM, a RAM and other peripheral circuits. ON/OFF operation information originating from the selector switch 19, is input to the controller 17. Based upon the ON/OFF operation information provided from the selector switch 19 and input thereto, the controller 17 outputs a switching signal to the direction switching valve 5 so as to control the position to which the direction switching valve 5 is to be set.

The controller 17 is connected with the relief valve 23 via a control line 20. The relief valve 23 is an electromagnetic variable relief valve via which the maximum pressure of the pressure oil supplied from the hydraulic pump 2 to the fan motor 3 is regulated in correspondence to an electric current value (instruction value) output by the controller 17 so as to control the pump discharge pressure Pp. The controller 17 controls a relief pressure setting at the relief valve 23. In other words, the controller 17 is capable of controlling the rotation speed of the fan motor 3 by controlling the pump discharge pressure Pp which is the intake-side pressure at the fan motor 3.

The controller 17, which is connected with the relief valve 23 through a control line 21, detects a feedback current value provided from the relief valve 23.

It is to be noted that, although not shown, the wheel loader 100 is equipped with a work hydraulic pump driven by the engine 1, a control valve via which pressure oil discharged from the work hydraulic pump is controlled and work hydraulic cylinders (e.g., the bucket cylinder 115 and the arm cylinder). The control valve is driven as an operation lever (not shown) is operated, and an actuator can be driven in correspondence to the operation quantity representing the extent to which the operation lever is operated.

Under normal circumstances, the controller 17 in the wheel loader 100 structured as described above executes control when the engine 1 is engaged in operation so as to cause forward rotation of the fan motor 3 by switching the direction switching valve 5 to the L position (forward). In response, the fan motor 3 is caused to rotate forward with the pressure oil supplied from the hydraulic pump 2. As the fan motor 3 rotates forward, cooling air is delivered from the cooling fan 4 toward the radiator 6 and the oil cooler 7, as indicated by arrows 12 in FIG. 2, and the cooling water and the hydraulic oil at the engine 1 are cooled through heat exchange with the cooling air.

If the outside air is supplied as the cooling air along a single direction, dust and the like contained in the outside air is bound to collect in the air passages at the radiator 6 and the oil cooler 7 and thus the air passages are bound to become narrower. This will result in lowered efficiency in the heat exchange with the outside air, which, in turn, may lead to problems such as overheating at the engine 1 and an increase in the temperature of the hydraulic oil. In order to prevent these problems, the fan motor 3 in the embodiment is caused to rotate in the reverse direction and the air passages can be cleared by blowing away any dust having collected in the air passages with air delivered along a direction opposite from the normal air flow direction. Through these measures, it is ensured that the radiator 6 and the oil cooler 7 are able to sustain the required performance levels.

As the operator turns on the selector switch 19, the controller 17 executes control so as to switch the direction switching valve 5 to the M position (reverse). In response, the fan motor 3 is caused to rotate in the reverse direction by pressure oil supplied from the hydraulic pump 2. As the fan motor 3 rotates in the reverse direction, i.e., as the cooling fan 3 rotates in the reverse direction, outside air is delivered toward the radiator 6 and the oil cooler 7 along the direction opposite from the normal air flow direction, as indicated by arrows 13 in FIG. 2.

If control for switching the direction switching valve 5 to the M position (reverse) was executed so as to cause the fan motor 3 to rotate in the reverse direction at the same time as the selector switch 19 was turned on, the circuit internal pressure would rise suddenly and large loads placed on the fan motor 3, the direction switching valve 5 and the relief valve 23 could compromise the durability of those components.

Accordingly, control is executed in the embodiment so that as the selector switch 19 is turned on, the pressure setting at the relief valve 23 is adjusted to reduce the pump discharge pressure Pp and the rotation speed of the fan motor 3 is thus lowered to a sufficient extent before the direction switching valve 5 is switched to the M position (reverse).

Figure 3:
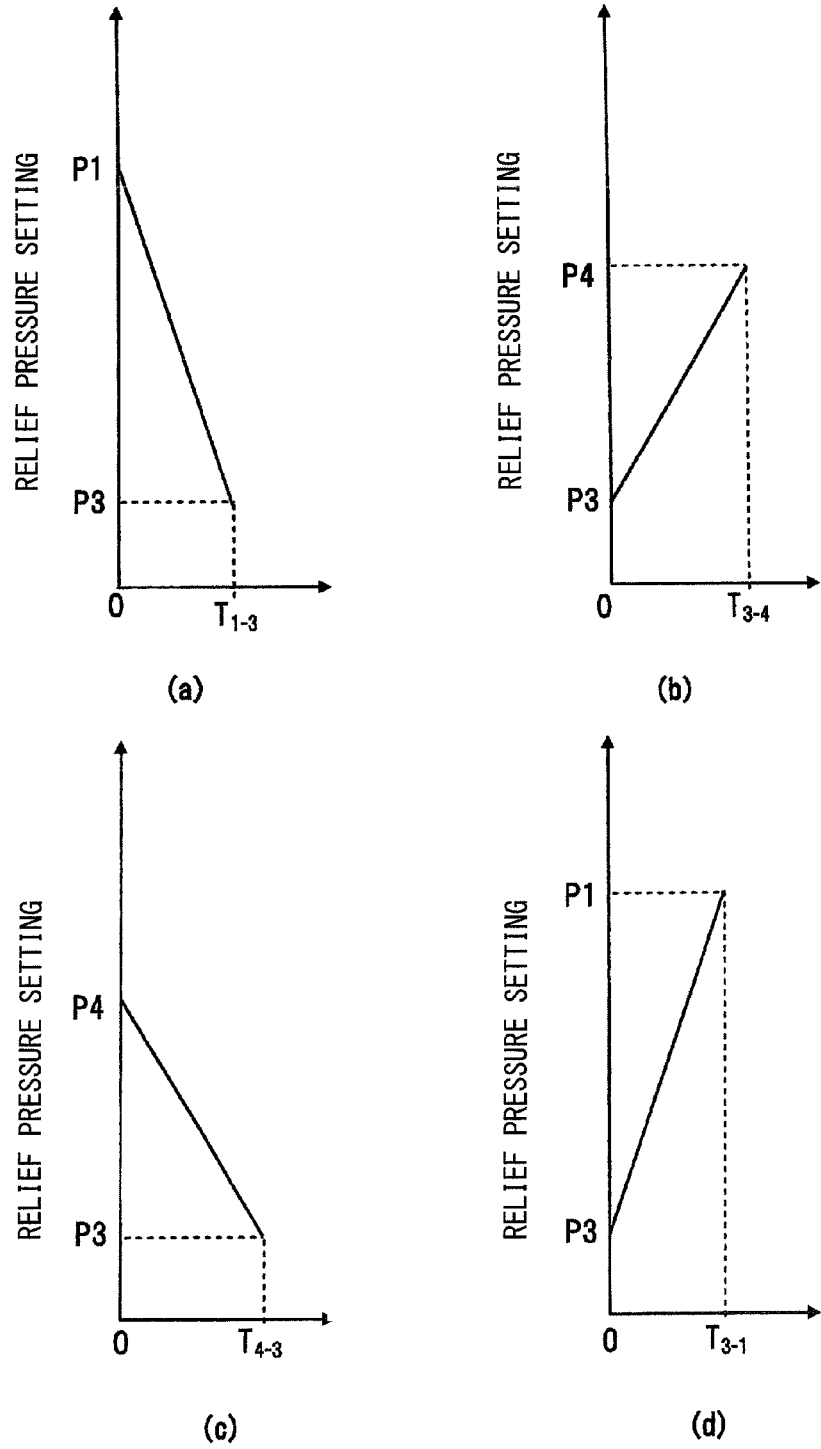

Tables (see FIG. 3) referenced when controlling the pressure setting at the relief valve 23 are stored in the ROM or the RAM at the controller 17. FIG. 3(*a*) shows the table referenced in order to lower the relief pressure setting currently at a forward rotation pressure setting (P1=19 MPa), to a lower limit value designated as a switching pressure setting (P3=5 MPa) while a predetermined length of time ($T_{1-3}$ sec) elapses. According to the table in FIG. 3(*a*), the relief pressure setting decreases linearly over time. FIG. 3(*b*) shows the table referenced in order to raise the relief pressure setting, currently at the switching pressure setting (P3=5 MPa), to a reverse rotation pressure setting (P4=15 MPa) while a predetermined length of time ($T_{3-4}$ sec) elapses. According to the table in FIG. 3(*b*), the relief pressure setting increases linearly over time.

FIG. 3(*c*) shows the table referenced in order to lower the relief pressure setting, currently at the reverse rotation pressure setting (P4=15 MPa), to the switching pressure setting (P3=5 MPa) while a predetermined time elapses ($T_{4-3}$ sec). According to the table in FIG. 3(*c*), the relief pressure setting decreases linearly over time. FIG. 3(*d*) shows the table referenced in order to raise the relief pressure setting, currently at the switching pressure setting (P3=5 MPa), to the forward pressure setting (P1=19 MPa) while a predetermined length of time ($T_{3-1}$ sec) elapses. According to the table in FIG. 3(*d*), the relief pressure setting increases linearly over time.

The controller 17 references a specific table among these tables, selected in correspondence to the current conditions, and outputs an output electric current value to the relief valve 23 based upon the referenced table so as to adjust the relief pressure setting accordingly. The time lengths $T_{1-3}$, $T_{3-4}$, $T_{4-3}$ and $T_{3-1}$ may each be set to, for instance, 2 to 3 seconds so as to allow the relief pressure to decrease or increase in a stable manner.

The forward rotation pressure setting (P1) and the reverse rotation pressure setting (P4) are determined in correspondence to the specifications of the cooling fan 4. The forward rotation pressure setting (P1) is the pressure setting at which the cooling fan 4 rotates forward at the rated rotation rate Nr. The reverse rotation pressure setting (P4) is the pressure setting at which the cooling fan 4 rotates in the reverse direction at the rated rotation rate Nr.

The volume of air supplied via the cooling fan 4 rotating in the reverse direction at the rated rotation rate Nr is normally smaller than the volume of air supplied via the cooling fan 4 rotating forward at the rated rotation rate Nr. At such a cooling fan, the amount of air resistance during reverse rotation is less than the air resistance during forward rotation. This means that a smaller pump discharge pressure Pp is required in order to cause reverse rotation of the cooling fan 4 at the rated rotation rate Nr compared to the pump discharge pressure Pp required to cause forward rotation at the rated rotation rate Nr. Accordingly, the forward rotation pressure setting for causing the fan motor 3 to rotate forward is set to P1=19 MPa and the reverse rotation pressure setting for causing the fan motor 3 to rotate in the reverse direction is set to P4=15 MPa, as described earlier.

If a single value was selected both for the forward rotation pressure setting and the reverse rotation pressure setting, on the other hand, the cooling fan 4 would be allowed to rotate forward at the rated rotation rate Nr but the cooling fan 4 would be caused to rotate in the reverse direction at a rotation rate exceeding the rated rotation rate Nr, which could adversely affect the durability of the cooling fan 4 and the fan motor 3.

In the ROM or the RAM at the controller 17, a switchover pressure (P2), which is used as a threshold value when making a decision as to whether or not the pump discharge pressure Pp, detected by the pressure sensor 14, has become lowered to a sufficient extent, is stored. The switch-over pressure (P2) takes on a value selected in advance so as to ensure that a smooth rotation direction switching operation is enabled by allowing the fan motor 3 to become sufficiently decelerated. The switching pressure setting (P3) is determined so as to take on a value smaller than that representing the switch-over pressure (P2). In the embodiment, the switch-over pressure is set so that P2=6.5 MPa and the switching pressure setting is set so that P3=5 MPa.

Figure 4:
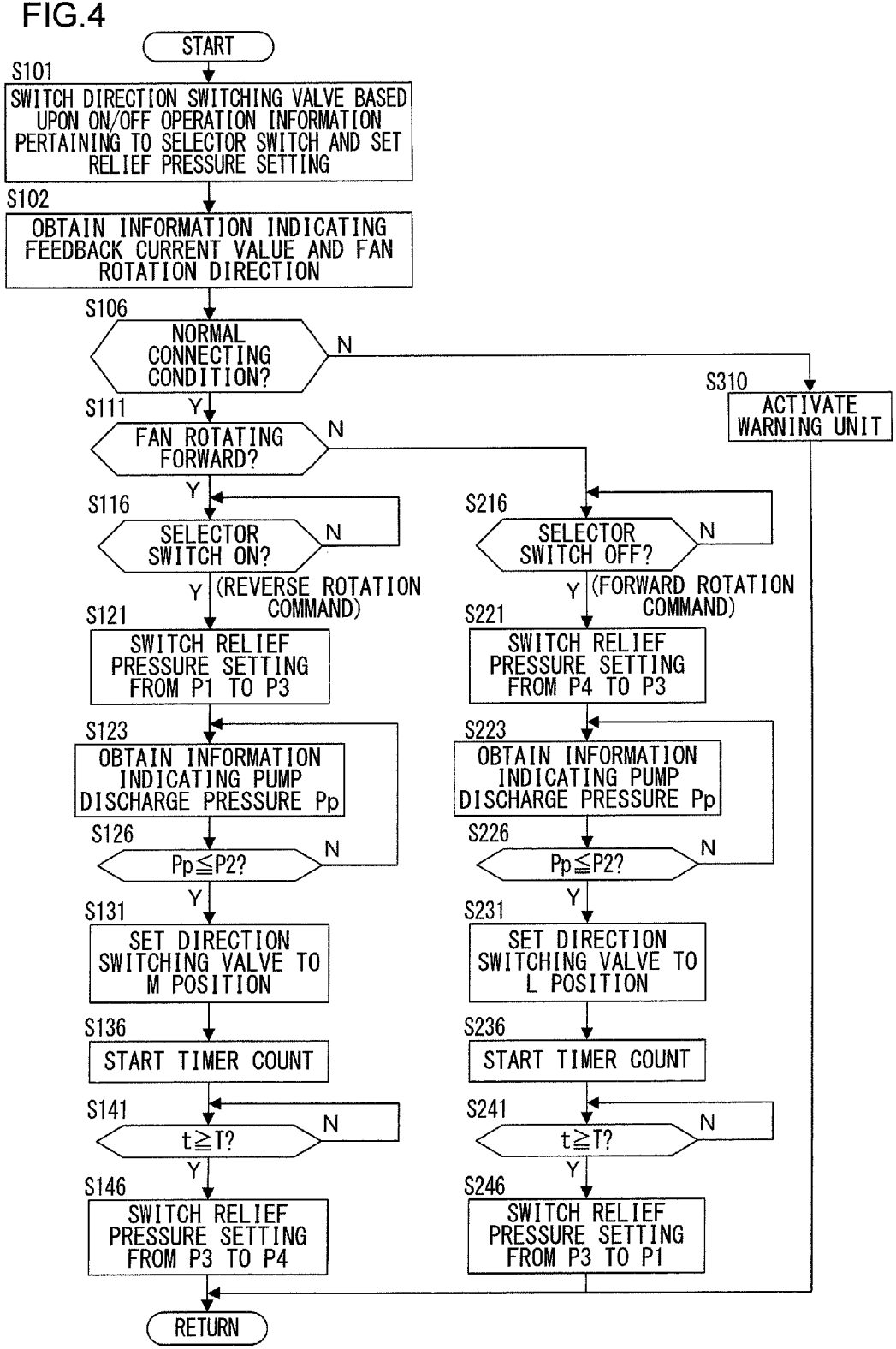
Figure 5:
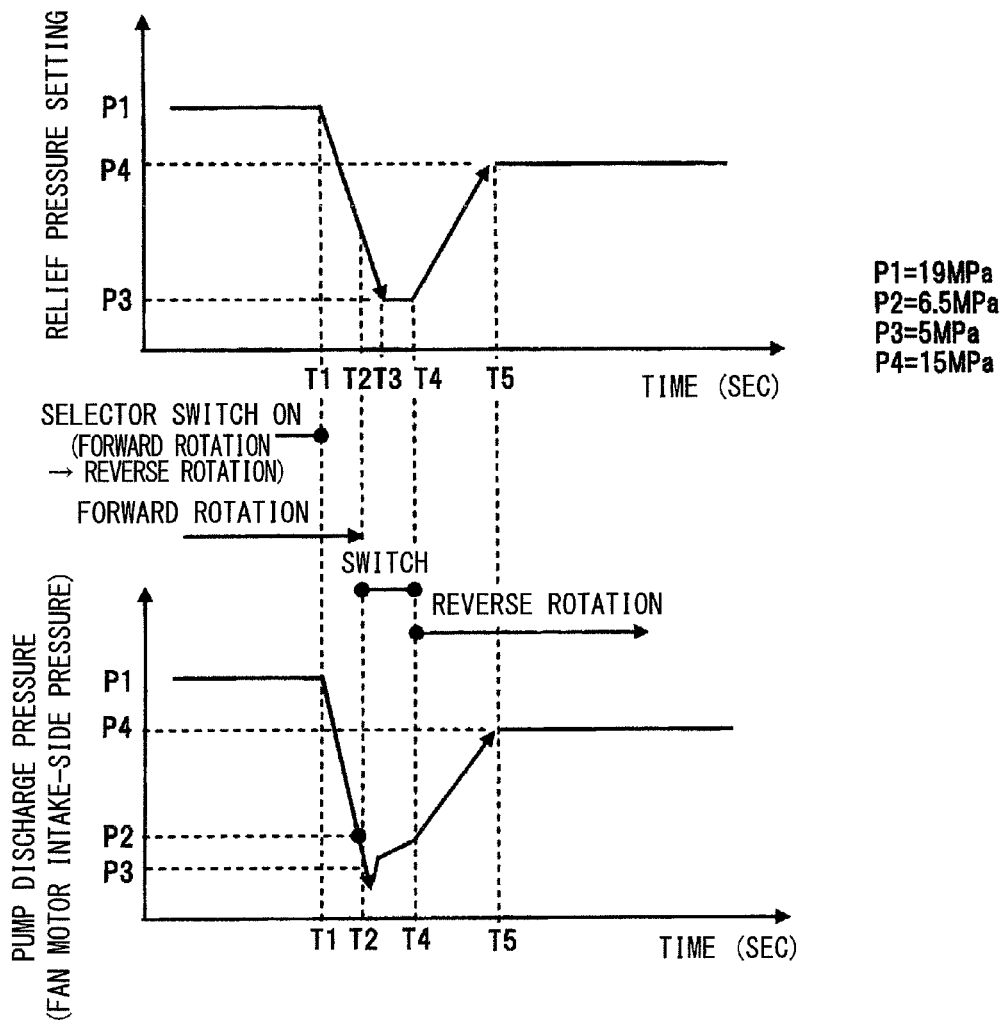
Figure 6:
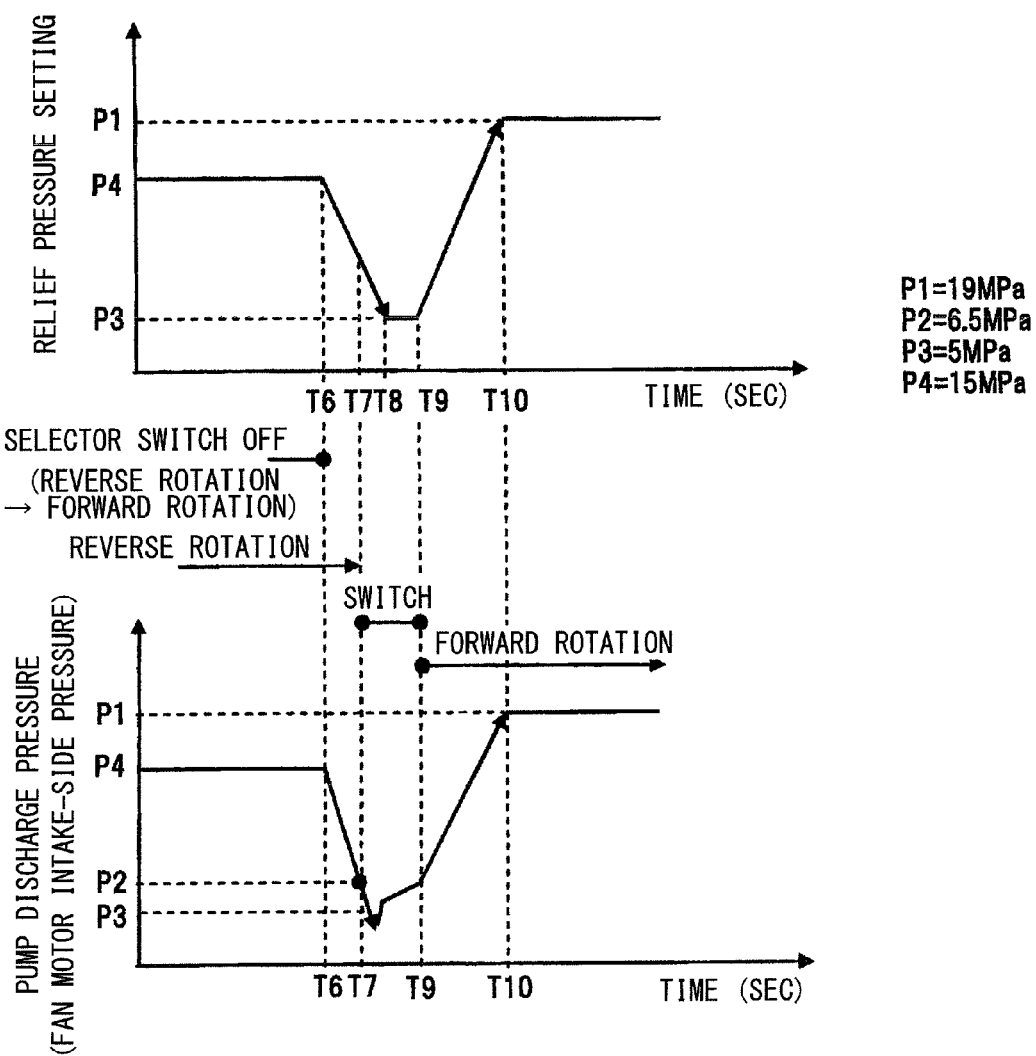

The controller 17 controls the various components as described below so as to allow the cooling fan 4 to rotate in the opposite direction only after the discharge pressure at the hydraulic pump 2 becomes lowered sufficiently. FIG. 4 presents a flowchart of the processing pertaining to the rotation direction switching operation performed for the cooling fan 4 as described above. FIG. 5 presents a time chart indicating the operational statuses assumed during the rotation direction switching operation performed to switch the direction of rotation at the cooling fan 4 from the forward direction to the reverse direction, whereas FIG. 6 presents a time chart indicating the operational statuses assumed during the rotation direction switching operation performed to switch the direction of rotation at the cooling fan 4 from the reverse direction to the forward direction. As an ignition switch (not shown) in the wheel loader 100 is turned on, a program enabling the processing shown in FIG. 4 is started up and is repeatedly executed by the controller 17.

In step S101, the controller 17 makes a decision with regard to ON/OFF operation at the selector switch 19, and if the selector switch 19 has been operated to the OFF position, it switches the direction switching valve 5 to the L position (forward) and sets the relief pressure setting to the forward rotation pressure setting (P1) so as to cause forward rotation at the cooling fan 4. If, on the other hand, the selector switch 19 has been operated to the ON position, it switches the direction switching valve 5 to the M position (reverse) and sets the relief pressure setting to the reverse rotation pressure setting (P4) so as to cause reverse rotation at the cooling fan 4.

Namely, in step S101, the controller 17 outputs a corresponding output electric current value (instruction value) Ai to the relief valve 23 so as to set either the forward rotation pressure setting (P1) or the reverse rotation pressure setting (P4) for the relief pressure setting based upon the ON/OFF operation information from the selector switch 19.

In step S102, information indicating the feedback current value Af provided from the relief valve 23 via the control line 21 and input to the controller 17, and information indicating the rotation direction at the cooling fan 4, i.e., the ON/OFF operation information from the selector switch 19, are obtained before the operation proceeds to step S106.

In step S106, a decision is made as to whether or not a normal connecting condition is sustained in the connecting lines (control lines 20 and 21) connecting the controller 17 with the relief valve 23. The controller 17 compares the current value (instruction value) Ai having been output to the relief valve 23 in step S101 with the feedback current value Af returned from the relief valve 23 to the controller 17, having been detected in step S102. If the difference between the output electric current value Ai and the feedback current value Af is less than a predetermined value At (|Ai−Af|<At), the controller 17 decides that the connecting lines are not disconnected, i.e., they are in the normal connecting condition. However, if the difference between the output electric current value Ai and the feedback current value Af is equal to or greater than the predetermined value At (|Ai−Af|≥At), the controller 17 decides that the connecting line is disconnected, i.e., the connecting condition is abnormal.

Upon making an affirmative decision in step S106, i.e., upon deciding that the connecting condition at the connecting lines (control lines 20 and 21) between the controller 17 and the relief valve 23 is normal, the operation proceeds to step S111. In step S111, a decision is made, based upon the ON/OFF operation information of the selector switch 19, detected in step S101, as to whether or not the cooling fan 4 is currently controlled so as to rotate forward.

Upon making an affirmative decision in step S111, i.e., upon deciding that the cooling fan 4 is currently controlled so as to rotate forward, the operation proceeds to step S116 to make a decision as to whether or not the selector switch 19 has been turned on (operated to the reverse rotation setting). In other words, the selector switch 19 is monitored for an ON operation performed thereat.

Upon making an affirmative decision in step S116, i.e., upon deciding that the selector switch 19 has been turned on in order to cause a reverse rotation at the cooling fan 4 which is currently rotating forward at the rated rotation rate Nr, the operation proceeds to step S121. In step S121, a control signal (an electric current value Ai) is output to the relief valve 23 by referencing the table shown in FIG. 3(a) so as to lower the relief pressure setting, currently at the forward rotation pressure setting (P1), to the switching pressure setting (P3) over the predetermined length of time as indicated by the preselected characteristics.

As shown in FIG. 5, in response to an ON operation at the selector switch 19 performed at a time point T1, the control signal (current value Ai) is input to the relief valve 23 so as to lower the relief pressure setting, currently at the forward rotation pressure setting (P1), to the switching pressure setting (P3) during the period of time elapsing between the time point T1 and a time point T3. As a result, the pump discharge pressure Pp decreases as the relief pressure setting becomes lower.

As shown in FIG. 4, in the following step S123, information indicating the discharge pressure Pp at the hydraulic pump 2, detected via the pressure sensor 14, is obtained and in step S126, a decision is made as to whether or not the detected pump discharge pressure Pp is equal to or less than P2 (Pp≤P2) designated as the switch-over pressure.

Upon making an affirmative decision in step S126, i.e., upon deciding that the pump discharge pressure Pp is equal to or less than P2 (Pp≤P2), the operation proceeds to step S131. If, on the other hand, a negative decision is made in step S126, i.e., if it is decided that the pump discharge pressure Pp is greater than P2, the operation returns to step S123 to obtain information indicating the pump discharge pressure Pp. Namely, in step S121, the controller 17 executes control under which the relief pressure setting is lowered to the switching pressure setting (P3) while the predetermined length of time elapses and also monitors the pump discharge pressure Pp so as to make a decision as to whether or not the pump discharge pressure Pp, decreasing as the relief pressure setting decreases, has been lowered to the switch-over pressure (P2).

In step S131, the controller 17 switches the direction switching valve 5 to the M position (reverse) by outputting a switching signal (a current or a voltage) to the direction switching valve 5 so as to switch the direction of the pressure oil flow to the fan motor 3 to the opposite direction, and then in the following step S136, the controller 17 starts a time count on a built-in timer. As shown in FIG. 5, as the pressure sensor 14 detects that the pump discharge pressure Pp has been lowered to P2 and the switching control for the direction switching valve 5 is executed at a time point T2, displacement of the spool (not shown) starts at the direction switching valve 5. The intake-side pressure Pp at the fan motor 3, which decreases to a level equal to or less than P3 due to under-shooting, then starts to increase due to the displacement of the spool in the direction switching valve 5. While the level of the intake-side pressure Pp temporarily rises to a level exceeding the relief pressure setting, it never spikes to a level at which the direction switching valve 5, the relief valve 23 or the fan motor 3 is subjected to an excessive load.

As shown in FIG. 4, the controller 17 makes a decision in step S141 as to whether or not the time count t at the timer has become equal to or greater than a predetermined time length setting T (t≥T). A value equivalent to the length of time required for a position switch-over at the direction switching valve 5 is selected for the time length setting T (e.g., T=2 sec), and this value is stored in advance in the ROM or the RAM at the controller 17. Namely, the controller 17 makes a decision as to whether or not the switch-over at the direction switching valve 5 has been completed by making a decision as to whether or not the time count t has become equal to or greater than the time length setting T.

Upon making an affirmative decision in step S141, i.e., upon deciding that the time count t at the timer has become equal to or greater than the time length setting T (t≥T), the operation proceeds to step S146. In step S146, a control signal (an electric current value Ai) is output to the relief valve 23 so as to raise the relief pressure setting, currently at the switching pressure setting (P3), to the reverse rotation pressure setting (P4) over the predetermined length of time as indicated by the preselected characteristics by referencing the table shown in FIG. 3(b), and then, the operation makes a return.

As shown in FIG. 5, once it is decided at a time point T4 that the time count t has become equal to or greater than the time length setting T, i.e., once it is decided that the switch-over at the direction switching valve 5 has been completed, the control signal (the current value Ai) is input to the relief valve 23 so as to raise the relief pressure setting, currently at the switching pressure setting (P3), to the reverse rotation pressure setting (P4) in the period elapsing between the time point T4 and a time point T5. Consequently, the pump discharge pressure Pp increases to the reverse rotation pressure (P4) as the relief pressure setting rises. The cooling fan 4 is thus caused to rotate in the reverse direction at the rated rotation rate Nr, thereby blowing dirt away from the heat exchanger.

As shown in FIG. 4, upon making a negative decision in step S111, i.e., upon deciding that the cooling fan 4 is currently controlled so as to rotate in the reverse direction, the operation proceeds to step S216. While the rotation direction switching operation processing executed in step S116 through step S146, to cause the cooling fan 4, currently rotating forward, to rotate in the reverse direction, has been described in detail earlier, the processing executed in step S216 through step S246 relates to the rotation direction switching operation executed to cause the cooling fan 4, currently rotating in the reverse direction, to rotate forward and the processing procedure over steps S216 through S246 is similar to that of the processing executed in step S116 through step S146 described earlier.

In step S216, a decision is made as to whether or not the selector switch 19 has been turned off (operated to the forward rotation setting). In other words, the selector switch 19 is monitored for an OFF operation performed thereat.

Upon making an affirmative decision in step S216, i.e., upon deciding that the selector switch 19 has been turned off in order to cause forward rotation at the cooling fan 4 which is currently rotating in the reverse direction at the rated rotation rate Nr, the operation proceeds to step S221. In step S221, a control signal (an electric current value Ai) is output to the relief valve 23 by referencing the table shown in FIG. 3(c) so as to lower the relief pressure setting, currently at the reverse rotation pressure setting (P4), to the switching pressure setting (P3) over the predetermined length of time as indicated by the preselected characteristics.

As shown in FIG. 6, in response to an OFF operation at the selector switch 19 performed at a time point T6, the control signal (the current value Ai) is input to the relief valve 23 so as to lower the relief pressure setting, currently at the reverse rotation pressure setting (P4) to the switching pressure setting (P3) during the period of time elapsing between the time point T6 and a time point T8. As a result, the pump discharge pressure Pp decreases as the relief pressure setting becomes lower.

As shown in FIG. 4, in the following step S223, information indicating the discharge pressure Pp at the hydraulic pump 2, detected via the pressure sensor 14, is obtained and in step S226, a decision is made as to whether or not the detected pump discharge pressure Pp is equal to or less than P2(Pp≤P2) designated as the switch-over pressure.

Upon making an affirmative decision in step S226, i.e., upon deciding that the pump discharge pressure Pp is equal to or less than P2(Pp≤P2), the operation proceeds to step S231. If, on the other hand, a negative decision is made in step S226, i.e., if it is decided that the pump discharge pressure Pp is greater than P2, the operation returns to step S223 to obtain information indicating the pump discharge pressure Pp. Namely, the controller 17, in step S221, executes control under which the relief pressure setting is lowered to the switching pressure setting (P3) while the predetermined length of time has elapsed, and also monitors the pump discharge pressure Pp so as to make a decision as to whether or not the pump discharge pressure Pp, decreasing as the relief treasure setting decreases, has been lowered to P2, the designated switch-over pressure.

In step S231, the controller 17 switches the direction switching valve 5 to the L position (forward) by outputting a switching signal (a current or voltage) to the direction switching valve 5 so as to switch the direction of the pressure oil flow to the fan motor 3 to the opposite direction, and then in the following step S236, the controller 17 starts a time count at the built-in timer. As shown in FIG. 6, as the pressure sensor 14 detects that the pump discharge pressure Pp has been lowered to P2 and the switching control for the direction switching valve 5 is executed at a time point T7, displacement of the spool (not shown) starts at the direction switching valve 5. The intake-side pressure Pp at the fan motor 3, which decreases to a level equal to or less than P3 due to under-shooting, then starts to increase due to the displacement of the spool in the direction switching valve 5. While the level of the intake-side pressure Pp temporarily rises to a level exceeding the relief pressure setting, it never jumps to a level at which the direction switching valve 5, the relief valve 23 or the fan motor 3 is subjected to an excessive load.

As shown in FIG. 4, the controller 17 makes a decision in step S241 as to whether or not the time count t at the timer has become equal to or greater than the predetermined time length setting T (t≥T). A value equivalent to the length of time required for a position switch-over at the direction switching valve 5 is selected for the time length setting T (e.g., T=2 sec), and this value is stored in advance in the ROM or the RAM at the controller 17. Namely, the controller 17 makes a decision as to whether or not the switch-over at the direction switching valve 5 has been completed by making a decision as to whether or not the time count t has become equal to or greater than the time length setting T.

Upon making an affirmative decision in step S241, i.e., upon deciding that the time count t at the timer has become equal to or greater than the time length setting T (t≥T), the operation proceeds to step S246. In step S246, a control signal (an electric current value Ai) is output to the relief valve 23 so as to raise the relief pressure setting, currently at the switching pressure setting (P3), to the forward rotation pressure setting (P1) over the predetermined length of time as indicated by the preselected characteristics by referencing the table shown in FIG. 3(*d*), and then, the operation makes a return.

As shown in FIG. 6, once it is decided at a time point T9 that the time count t has become equal to or greater than the time length setting T, i.e., once it is decided that the switch-over at the direction switching valve 5 has been completed, the control signal (the current value Ai) is input to the relief valve 23 so as to raise the relief pressure setting, currently at the switching pressure setting (P3), to the forward rotation pressure setting (P1) in the period between the time point T9 and a time point T10. Consequently, the pump discharge pressure Pp increases to the forward rotation pressure P1 as the relief pressure setting rises. The cooling fan 4 is thus caused to rotate in the forward direction at the rated rotation rate Nr, thereby guiding the cooling air toward the heat exchanger where it is used to cool the cooling water and the hydraulic oil.

If a negative decision is made in step S106, i.e., if it is decided that the connecting condition at the connecting lines (the control lines 20 and 21) between the controller 17 and the relief valve 23 is not normal due to disconnection or the like, the operation proceeds to step S310. In step S310, a warning unit such as a warning lamp is activated (lit) in order to warn the operator that the connecting condition between the controller 17 and the relief valve 23 is not normal, and the operation makes a return without executing the rotation direction switching operation described earlier. It is to be noted that instead of lighting a warning lamp, a warning sound may be generated.

Namely, if the connecting condition between the controller 17 and the relief valve 23 is abnormal, the controller 17 does not output a switching signal for switching the direction switching valve 5 to the M position (the reverse rotation setting) in response to an ON (reverse rotation) operation performed at the selector switch 19 while the cooling fan 4 is rotating forward. As a result, the cooling fan 4 is allowed to continue rotating in the current rotation direction (forward). Likewise, if the connecting condition between the controller 17 and the relief valve 23 is abnormal, the controller does not output a switching signal for switching the direction switching valve 5 to the L position (the forward rotation setting) in response to an OFF (forward rotation) operation performed at the selector switch 19 while the cooling fan 4 is rotating in the reverse direction.

The following advantages are achieved through the embodiment described above.

(1) As the selector switch 19 is operated to the reverse rotation setting (ON operation) while the cooling fan 4 is rotating forward, the controller 17 controls the pressure setting at the relief valve 23 so as to lower the discharge pressure Pp at the hydraulic pump 2 to the switch-over pressure (P2). Once the pressure sensor 14 detects that the discharge pressure Pp at the hydraulic pump 2 has been lowered to the switch-over pressure (P2), the controller 17 switches the direction switching valve 5 from the L position (forward rotation) to the M position (reverse rotation) so as to switch the direction of the pressure oil flow from the hydraulic pump 2 to the fan motor 3 to the opposite direction. Subsequently, once the controller 17 decides that the switch-over at the direction switching valve 5 has been completed, the controller 17 controls the pressure setting at the relief valve 23 so as to raise the discharge pressure Pp at the hydraulic pump 2 to the reverse rotation pressure (P4).

Since control is executed so as to cause the fan motor 3 to rotate in the opposite direction only after the pressure sensor 14 detects that the discharge pressure Pp at the hydraulic pump 2 has gone down to the switch-over pressure (P2) as described above, an increase in the pressure within the hydraulic circuit can be inhibited during the rotation direction switching operation executed to switch the rotation direction of the cooling fan 4. As a result, the cooling fan 4, currently rotating forward, can be switched to rotate in the reverse direction smoothly without lowering the durability of the relief valve 23, the direction switching valve 5, the fan motor 3 and the like. It is to be noted that through similar processing executed when switching the rotation direction at the cooling fan 4 currently rotating in the reverse direction, it is ensured that the cooling fan 4 currently rotating in the reverse direction is switched to rotate forward smoothly without compromising the durability of the various components.

In contrast, the technology whereby the cooling fan 4 is allowed to rotate in the opposite direction once a predetermined length of time has elapsed following an ON operation performed at the selector switch 19 without detecting the pump discharge pressure Pp (hereafter referred to as a comparison example) is bound to give rise to the following problems.

In the comparison example, the control for causing the cooling fan 4 to rotate in the opposite direction will be executed once the predetermined length of time lapses, even if the pump discharge pressure Pp is not lowered to the switch-over pressure (P2) due to a malfunction or the like at the controller 17 or the relief valve 23. Under such circumstances, the pressure within the hydraulic circuit may spike as the rotation direction at the cooling fan 4 is switched, giving rise to a concern that the durability of the direction switching valve 5, the relief valve 23 and the fan motor 3, subjected to an excessive load, may be compromised. It is to be noted that while an overload relief valve may be installed in order to prevent an excessive increase in the pressure in the hydraulic circuit, the extra cost attributable to the overload relief valve installation is bound to be significant.

In the comparison example, the rotation direction switching operation control is executed by assuming that the intake-side pressure at the fan motor 3 has been fully lowered based upon the length of time elapsing following an ON operation at the selector switch 19, and for this reason, a sufficient time margin needs to be allowed in the length of time elapsing after the ON operation at the selector switch 19. As a result, the rotation direction switching operation for the cooling fan 4 is bound to take longer.

(2) A decision is made as to whether or not the connecting condition at the connecting lines (control lines 20 and 21) between the relief valve 23 and the controller 17 is normal, and upon deciding that the connecting condition is not normal, the switching signal used to switch the direction switching valve 5 is not output, regardless of the ON/OFF state of the selector switch 19, so as to sustain the current rotation direction at the cooling fan 4. In other words, the rotation direction switching operation processing described earlier is not executed if a disconnection or the like has caused an abnormality in the connecting condition. Through these measures, the pump discharge pressure Pp (motor drive pressure) can be lowered or raised in a stable manner through the rotation direction switching operation processing executed only if the connecting condition between the relief valve 23 and the controller 17 is normal.

(3) A higher value is selected for the forward rotation pressure setting (P1) than that selected for the reverse rotation pressure setting (P4), so as to ensure that the hydraulic pump discharge pressure Pp during forward rotation is higher than the hydraulic pump discharge pressure Pp during reverse rotation. As a result, the fan motor 3 used in conjunction with a regular cooling fan 4, which supplies a smaller volume of air when it rotates in the reverse direction at the rated rotation rate Nr than when it rotates forward at the rated rotation rate Nr, can be engaged in operation without adversely affecting the durability of the fan motor 3 or the cooling fan 4.

The following variations are also within the scope of the present invention, and one of the variations or a plurality of the variations may be adopted in combination with the embodiment described above.

(Variations)

(1) In the description provided above, it is decided that the connecting condition at the connecting lines between the controller 17 and the relief valve 23 is not normal if the difference between the output electric current value Ai and the feedback current value Af is equal to or greater than the predetermined value At. However, the present invention is not limited to this example.

For instance, the number of instances in which the difference between the output electric current value Ai and the feedback current value Af is equal to or greater than the predetermined value At may be counted and it may be decided that the connecting condition at the connecting lines between the controller 17 and the relief valve 23 is not normal when the number of such instances exceeds a predetermined value. In this case, an erroneous detection can be prevented. Furthermore, an imminent disconnection at a connecting line can be anticipated. If it is decided that a connecting line is likely to become disconnected, control processing similar to that described earlier should be executed so as to ensure that the operation for switching the rotation direction at the cooling fan 4 is not to be executed and to alert the operator to an imminent disconnection by activating a warning unit such as a warning lamp.

As an alternative, it may be decided that there is an abnormality in the connecting condition at the connecting lines between the controller 17 and the relief valve 23 when the state in which the difference between the output electric current value Ai and the feedback current value Af is equal to or greater than the predetermined value At is sustained over a predetermined length of time.

(2) While the decision with regard to the connecting condition at the connecting lines between the controller 17 and the relief valve 23 is made based upon whether or not the difference between the output electric current value Ai and the feedback current value Af is less than the predetermined value At in the description provided above, the present invention is not limited to this example. For instance, the connecting condition may be determined based upon voltage values.

(3) While a higher value is selected for the forward rotation pressure setting (P1) at which the fan motor 3 rotates forward, compared to the value selected for the reverse rotation pressure setting (P4) at which the fan motor 3 rotates in the reverse direction, the present invention is not limited to this example. For instance, if the volume of air supplied by the cooling fan 4 during forward rotation is not much different from the volume of air provided by the cooling fan 4 during reverse rotation, a single value may be selected for the forward rotation pressure setting and the reverse rotation pressure setting.

(4) While the controller 17 makes a decision as to whether or not the switch-over at the direction switching valve 5 has been completed based upon the time count at the timer in the description provided above, the present invention is not limited to this example. A position detection unit that mechanically detects the newly assumed switching position at the direction switching valve 5 may be installed and in such a case, the controller 17 may make a decision as to whether or not the switch-over at the direction switching valve 5 has been completed based upon a detection signal provided by the position detection unit.

(5) While the cooling fan 4 is caused to rotate forward or in the reverse direction in response to a manual ON/OFF operation performed at the selector switch 19 in the description provided above, the present invention is not limited to this example. While the cooling fan 4 is running, its rotation direction may be switched from forward to reverse after an interval that lasts a predefined length of time. In such a case, the cooling fan 4, having been caused to rotate in the reverse direction through the rotation direction switching operation, should be allowed to continue rotating in the reverse direction for a predetermined length of time and then switch back to forward rotation.

(6) In the description provided above, the relief pressure setting selected when switching the rotation direction at the cooling fan 4 is P3, which is lower than the switch-over pressure P2. However, the present invention is not limited to this example. The relief pressure setting selected when switching the rotation direction at the cooling fan 4 may assume a value matching that of the switch-over pressure P2.

(7) While the wheel loader 100 represents an example of a work vehicle in the description provided above, the present invention is not limited to this example and may be adopted in another type of work vehicle such as a forklift, a telescopic handler or a lift truck.

While the invention has been particularly shown and described with respect to a preferred embodiment and variations thereof by referring to the attached drawings, the present invention is not limited to these examples and it will be understood by those skilled in the art that various changes in form and detail may be made therein without departing from the spirit, scope and teaching of the invention.

The disclosure of the following priority application is herein incorporated by reference:

Japanese Patent Application No. 2011-250021 filed Nov. 15, 2011.

The invention claimed is:

1. A cooling fan control device, comprising:
a hydraulic pump driven by an engine;
a hydraulic motor that is driven with pressure oil discharged from the hydraulic pump and rotates a cooling fan used to supply cooling air to a heat exchanger;
a direction switching valve that causes the hydraulic motor to rotate in a forward direction or in a reverse direction by switching direction of a flow of oil discharged from the hydraulic pump;
a variable relief valve via which a discharge pressure at the hydraulic pump is controlled;
a pressure sensor that detects the discharge pressure at the hydraulic pump;
a rotation direction selector switch for switching a rotation direction of the cooling fan; and
a control unit that, in response to an operation performed at the rotation direction selector switch to select a reverse rotation setting while the cooling fan is rotating forward, lowers a relief pressure setting at the variable relief valve to a predetermined lower limit value over a first predetermined length of time, and once the discharge pressure at the hydraulic pump detected by the pressure sensor is lowered to a predetermined switch-over pressure, executes control so as to switch the direction of flow of pressure oil to the hydraulic motor to the reverse direction by switching the direction switching valve and raises the relief pressure setting at the variable relief valve to a reverse rotation pressure setting, at which the hydraulic motor rotates in the reverse direction, over a second predetermined length of time.

2. A cooling fan control device according to claim 1, wherein:
as the rotation direction selector switch is operated to a forward rotation setting while the cooling fan is rotating in the reverse direction, the control unit lowers the relief pressure setting at the variable relief valve to the predetermined lower limit value over a third predetermined length of time, and once the discharge pressure at the hydraulic pump detected by the pressure sensor is lowered to the predetermined switch-over pressure, the control unit executes control so as to switch the direction of flow of pressure oil to the hydraulic motor to the forward direction by switching the direction switching valve, and raises the relief pressure setting at the variable relief valve to a forward rotation pressure setting, at which the hydraulic motor rotates in the forward direction, over a fourth predetermined length of time.

3. A cooling fan control device according to claim 2, wherein:
the forward rotation pressure setting at which the hydraulic motor rotates in the forward direction is higher than the reverse rotation pressure setting at which the hydraulic motor rotates in the reverse direction, and the switch-over pressure is lower than the reverse rotation pressure setting at which the hydraulic motor rotates in the reverse direction.

4. A cooling fan control device according to claim 1, wherein:
the control unit includes a connecting condition determination unit that determines as to whether or not a connecting condition between the variable relief valve and the control unit is normal; and
if the connecting condition determination unit determines that the connecting condition is not normal, the control unit sustains a current rotation direction at the cooling fan without switching the direction switching valve even if the rotation direction selector switch is operated to select the reverse rotation setting while the cooling fan is rotating forward.

* * * * *